May 6, 1930.  V. BENDIX  1,756,936

BRAKE SHOE

Filed Oct. 8, 1927

INVENTOR
VINCENT BENDIX
BY
M. W. McConkey
ATTORNEY

Patented May 6, 1930

1,756,936

UNITED STATES PATENT OFFICE

VINCENT BENDIX, OF CHICAGO, ILLINOIS, ASSIGNOR TO BENDIX BRAKE COMPANY, OF CHICAGO, ILLINOIS, A CORPORATION OF ILLINOIS

BRAKE SHOE

Application filed October 8, 1927. Serial No. 224,791.

This invention relates to brake shoes, or equivalent brake elements, and is illustrated as embodied in a rigid arcuate shoe for an internal expanding automobile brake.

An object of the invention is to simplify the manufacture of the shoes by eliminating the riveting of the lining, preferably by providing metallic inserts in the lining which are welded to the shoe proper. I consider it best to arrange a pair of metallic inserts along opposite sides of the lining, and to weld them at intervals to the side edges of the shoe.

The above and other objects and features of the invention, including various novel and desirable details of construction, will be apparent from the following description of one illustrative embodiment shown in the accompanying drawing, in which.

Figure 1:
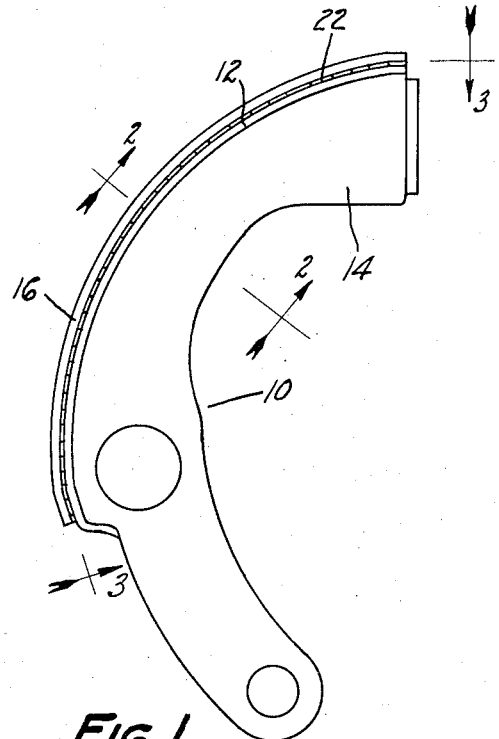
Figure 1 is a side elevation of the shoe.
Figure 2:
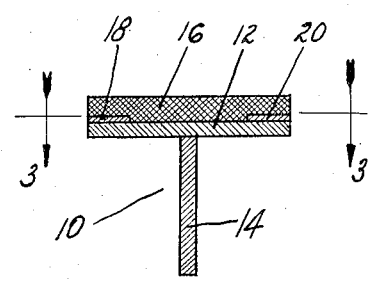
Figure 2 is a section through the shoe on the line 2—2 of Figure 1.
Figure 3:
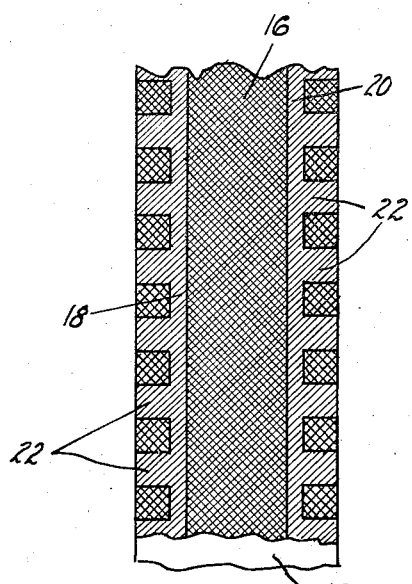
Figure 3 is a partial curved or developed section lengthwise of the shoe on the line 3—3 of Figure 1 or Figure 2.

The shoe proper 10, or equivalent brake element, may be of any desired construction, the one illustrated being built up of a curved outer steel stamping or rim 12 and a steel stamping or stiffening web 14, welded or otherwise secured together to form a T-section structure.

The lining 16, which may be of any of the usual asbestos body friction compositions, either woven or molded, is provided along its opposite sides, on its lower face, with two inserts 18 and 20 of steel or iron or the like, illustrated as formed with rectangular shaped tongues or projections 22 which are exposed along the opposite side edges of the lining.

The lining is secured to the part 12 of the shoe by welding each of the edges of tongues 22 to the edge of that part of the shoe on which it is superposed.

While one illustrative embodiment has been described in detail, it is not my intention to limit the scope of the invention to that particular embodiment, or otherwise than by the terms of the appended claims.

I claim:

1. A metallic brake element, having a friction lining including adjacent each side edge a metallic insert, each insert being welded to the edge of said element.

2. A metallic brake element, having a friction lining including adjacent each side edge a metallic insert, the superposed edges of the inserts and of said element being welded together.

3. A metallic brake element, having a friction lining including adjacent each side edge a metallic insert, the superposed edges of the inserts and of said element being welded together at a series of spaced points.

4. That method of manufacturing a brake shoe which comprises forming an arcuate band of friction material, inserting metallic inserts along the edges of said band and subsequently welding at spaced intervals a metallic supporting rim member to said inserts.

5. A brake shoe including a metallic rim element and a friction lining having metallic inserts integrally secured to each edge of said element.

6. A brake shoe including a friction lining having longitudinally extending metallic inserts secured to each edge thereof, said inserts characterized by having laterally extending spaced projections.

7. A brake shoe including a metallic rim and a friction lining substantially of non-metallic structure constructed to be welded to said rim at spaced intervals along the edges thereof.

8. A metallic brake element having a friction lining including adjacent each side edge a metallic insert having spaced projections, the lining being superposed upon said element and welded thereto at the superposed edges of said projections and element.

9. A friction lining for a braking element characterized by having longitudinally extending metallic inserts along its side edges.

In testimony whereof, I have hereunto signed my name.

VINCENT BENDIX.